March 2, 1948.  W. A. HIGINBOTHAM  2,436,891

ELECTRONIC SYSTEM FOR DIFFERENTIATING VOLTAGE WAVEFORMS

Filed Feb. 19, 1945

INVENTOR.
WILLIAM A. HIGINBOTHAM
BY
William D. Hall
Attorney

Patented Mar. 2, 1948

2,436,891

UNITED STATES PATENT OFFICE 2,436,891

ELECTRONIC SYSTEM FOR DIFFERENTIATING VOLTAGE WAVE FORMS

William A. Higinbotham, Santa Fe, N. Mex., assignor, by mesne assignments, to the United States of America, as represented by the Secretary of War Application February 19, 1945, Serial No. 578,768

3 Claims. (Cl. 250—27)

This invention relates in general to electrical wave modifying circuits and more particularly to an electronic system for differentiating voltage waveforms.

In many instances of electrical and electronic arrangements it is necessary to examine non-linear voltage waveforms, for example hyperbolic and parabolic waves, to determine the degree of their deviation from the mathematical function to which it is desired that they conform. Because of the complex shape of this sort of wave, it is often convenient to examine a derivative of the waveform rather than the waveform itself, the derivative being simpler in form.

Accordingly, it is one of the objects of my invention to provide means having great accuracy for obtaining from such a wave a second waveform which is proportional to the mathematical derivative of the original wave.

Systems for accomplishing this result in general are known in the art. The most common type of previously known differentiator circuit consists of a resistor and a capacitor in series connection, across which combination a voltage waveform is impressed. Variation in the impressed voltage causes the capacitor to charge and discharge with a resulting flow of current through the resistor. The varying voltage drop across the resistor is an approximation of the first derivative of the applied voltage waveform, if the time constant of the differentiator circuit is small when compared with the period of the impressed voltage, assuming that this voltage is periodic in nature. The smaller the time constant in comparison to the period of the impressed varying voltage, the closer is the approximation of the voltage appearing across the resistor to the mathematical derivative of the impressed voltage function.

A mathematical analysis of the electrical relationships in such a circuit will illustrate the foregoing discussion.

Let $e$ be applied voltage variation, $i$ be the current flowing in the circuit, $R$ be the resistance in ohms of the resistor, $q$ be the charge in coulombs on the condenser, $C$ be the capacitance of the condenser.

(1) $$e = iR + \frac{q}{C}$$

(2) $$\frac{de}{dt} = R\frac{di}{dt} + \frac{1}{C}\frac{dq}{dt}$$

(3) $$\frac{de}{dt} = R\frac{di}{dt} + \frac{1}{C}i$$

Considering Equation 3 it is clear that the term $$R\frac{di}{dt}$$

must be reduced to zero if the current $i$ is to be exactly proportional to the first derivative $$\frac{de}{dt}$$

It is impossible to reduce R to zero because the output must be taken off this resistor.

The arrangement in accordance with my invention results in the effective reduction of the term R to a very small value without an appreciable reduction in output voltage from the circuit. This feature promotes to a high degree the accuracy of the action of the invention set out in this specification and accordingly this is another of the objects of my invention.

In practice, the circuit provides a means of applying in series with a differentiating resistor a voltage that is a function of the total drop across the differentiator resistor, and of such magnitude and polarity as to counter-balance the voltage drop across said resistor.

This counter-voltage is introduced by amplifying and inverting the voltage appearing across the differentiator resistor and passing it through a cathode follower. The load resistor of the cathode follower forms a fraction of the differentiator resistor and since no further inversion of the voltage is brought about in the cathode follower, negative feedback occurs.

Therefore the total drop across the differentiator resistance is very small. The charge on the condenser is moved more rapidly as a result of the decreased drop across the resistor. The same electric effect on the circuit might be produced by replacing the differentiator resistor and the series voltage by a very small resistor. This results in a very short time constant for the differentiator circuit. The output of this circuit is the voltage fed back in series with the differentiating resistor, which appears across the load resistor of the output cathode follower.

Figure 1:
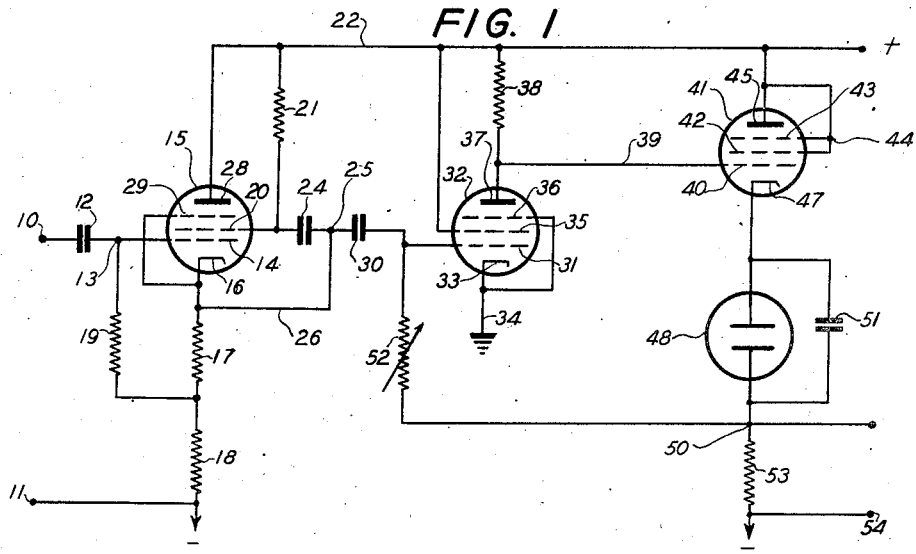
Fig. 1 shows one embodiment of my invention.

Referring first to Fig. 1 input terminals 10 and 11 are adapted to have impressed thereon voltage variations to be studied. Tube 15 is connected as a cathode follower as may be seen by the following. Terminal 10 is connected by coupling capacitor 12 to junction point 13 and thence to control grid 14 of thermionic or vacuum tube 15. The cathode 16 of vacuum tube 15 is connected through a bias resistor 17 and a cathode load resistor 18 in series to terminal 11. A grid resistor 19 is connected between terminal 13 and the junction of resistor 17 and 18. The screen grid 20 is connected through a dropping resistor 21 to a suitable source of positive potential. Screen grid 20 is also effectively connected to cathode 16 for alternating current by by-pass capacitor 24 connected between it and terminal point 25 which is in turn connected to the cathode 16 by wire 26. Tube 15 has its anode 28 connected to a suitable source of positive potential. The suppressor grid 29 is maintained at cathode potential by a connection thereto.

The cathode follower stage as described above forms a highly desirable means of isolating the alternating voltage generator from the differentiator circuit. Thus, the loading on the generator is reduced with a resulting increase in accuracy.

From junction 25 the output is fed to the differentiator proper which consists of a capacitor 30 in series with resistors 52 and 53. The control grid 31 of thermionic or vacuum tube 32 is connected to the junction between capacitor 30 and resistor 52. Cathode 33 and suppressor grid 36 of tube 32 are maintained at ground potential by suitable connections thereto. Screen grid 35 is connected to a suitable source of positive potential. Anode 37 is connected through load resistor 38 to a source of positive potential. The output of tube 32 is directly connected to the control grid 40 of thermionic or vacuum tube 41 by wire 39 connected between grid 40 and the junction of anode 37 and resistor 38.

Tube 41 is an ordinary pentode connected as a triode by connecting grids 42 and 43 to a junction point 44 and thence by suitable connection to anode 45. Anode 45 is connected to a suitable source of positive potential. The cathode 47 is maintained at a fixed potential above output terminal 59 by a suitable constant potential device. In this description, the constant potential device consists of a suitable gaseous regulator tube 48 connected between cathode 47 and junction point 50. A capacitor 51 is connected in shunt with the regulator tube 48 to assist in reducing fluctuations in potential. A resistor 53, part of the differentiator resistance, is connected between junction point 50 and terminal 54. A second part of the differentiator resistance, resistor 52, is connected between junction point 50 and the junction between condenser 30 and control grid 31 of vacuum tube 32. Resistor 53 serves also as a cathode load for vacuum tube 41. Terminal 54 cooperates with terminal 50 to form a pair of output terminals. Terminals 11 and 54 may be maintained at a negative potential with respect to ground, this potential preferably being greater than any potential variations impressed upon grid 14 of vacuum tube 15.

Considering the differentiator system, the combination of capacitor 30 and resistances 52 and 53 together constitute a simple differentiator system. Theoretically the voltage drop across resistances 52 and 53 in series is substantially proportional to the rate of change of potential across coupling capacitor 30. In order for the circuit to function as an accurate differentiator circuit, it is important that the product of the capacitance in farads of capacitor 30 and the resistance in ohms of resistors 52 and 53 be low compared to the duration of a voltage sweep or charge. Thus, by way of example, in one instance, capacitance 30 had a value of 200 micromicrofarads, while resistance 52 had a maximum value of 200,000 ohms. Resistor 53 was small in comparison to resistor 52 and had a value of about 10,000 ohms. By comparsion with resistor 52, resistor 53 is negligible and the drop across it as far as the accuracy of potentials on grid 31 is concerned may be entirely disregarded. Thus, it becomes important to compensate for the drop across resistor 52.

The potential of the high side of resistor 52 is impressed on grid 31 of tube 32 and results in amplified potentials reversed in polarity at anode 37. Tube 32 is preferably a pentode and so operated that the space current therethrough is proportional to the grid voltage. The amplified voltage variations at anode 37 are impressed directly on control grid 40 of cathode follower 41. Due to the comparatively high potential impressed upon grid 40, it is necessary to maintain cathode 47 at a constant high potential somewhat greater than the potential of grid 40 so that vacuum tube 41 may operate in a normal fashion. For this purpose regulator tube 48 or any other suitable resistive device may be used. Resistor 53 constitutes the load resistor for the cathode follower.

The amplification of vacuum tube 32 is adjusted by suitable design of the apparatus so that the output of the cathode follower appearing across resistor 53 very nearly compensates for the drop across resistor 52 due to the discharge current of the condenser 30.

The resultant variation of potential appearing on grid 14 of vacuum tube 15 and hence across resistor 53 is accurately the derivative of the input voltage variation.

Figure 2:
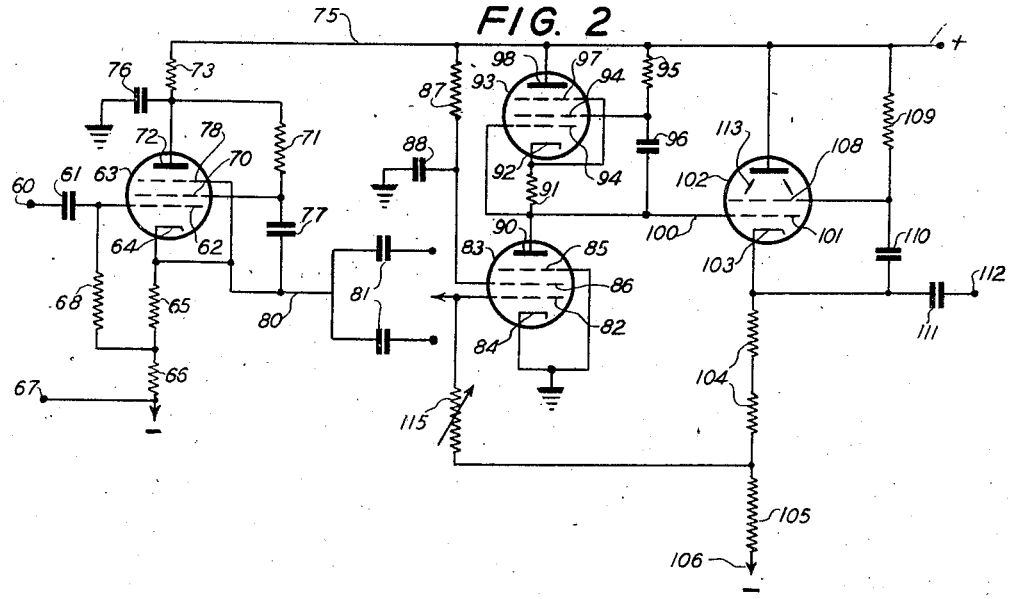
Fig. 2 shows another embodiment of my invention.

Referring now to Fig. 2, a further embodiment and somewhat more accurate circuit is shown. Input terminal 60 is connected through a coupling capacitor 61 to grid 62 of a cathode follower tube 63. This tube has its cathode 64 connected through bias resistor 65 and cathode load resistor 66, both in series, to the other input terminal 67. Grid 62 is connected through a grid resistor 68 to the junction of the bias resistor 65 and cathode load resistor 66. Accelerating grid 70 may be connected through a dropping resistor 71 to anode 72 and both connected through a dropping resistor 73 to a lead 75 connected to a suitable source of positive potential. Anode 72 may have a capacitor 76 connected between it and ground, its function being to by-pass resistor 73 to alternating currents so that it will not act as a load resistor. Accelerating grid 70 may be by-passed for alternating currents by a capacitor 77 connected between it and cathode. A suppressor grid 78 may also be connected directly to the cathode. From cathode 64 a lead 80 is taken to a coupling capacitor 81 and thence to control grid 82 of pentode 83. Cathode 84 and suppressor grid 85 are both grounded, while accelerating grid 86 may be connected through a dropping resistor 87 to lead 75, grid 86 also being by-passed by a capacitor 88. Anode 90 is connected through a bias resistor 91 to cathode 92 of a vacuum tube 93. Control grid 94 may be connected down to anode 90 of vacuum tube 83. An accelerating grid 94 may be biased to a suitable potential by a dropping resistor 95 connected to lead 75 and may be by-passed by a capacitor 96 going down to anode 90.

A suppressor grid 97 is connected to cathode 94, while an anode 98 may be connected directly to lead 75. From anode 90 of tube 83 a wire 100 goes directly to control grid 101 of a power tube 102. Cathode 103 is connected through a bias resistor 104 and a cathode load resistor 105 to a terminal 106. An accelerating grid 108 may be biased to a suitable positive potential by means of a dropping resistor 109 connected directly to lead 75 and may be by-passed by a capacitor 110 connected to cathode 103. From cathode 103 a connection is taken through a coupling capacitor 111 to an output terminal 112. The electron beam electrodes 113 may be connected in the usual fashion in power tubes through a resistor to the anode.

Connected between grid 82 of vacuum tube 83 and the junction of resistance 104 and 105 is a variable differentiator resistor 115.

Inasmuch as the cathode follower stage up to capacitor 81 is the same as in Fig. 1, no further explanation thereof is considered necessary. Again, as in Fig. 1, the combination of capacitor 81 and resistor 115 forms the differentiator circuit.

The potential across resistor 115 is impressed on control grid 82 and serves to create amplified potentials in reverse polarity at anode 90. A change in potential on grid 82 tends to change the amount of current flowing through tubes 83 and 93 and resistor 91, all of which are connected in series. A change in the current flowing through resistor 91 increases or decreases the voltage drop across it, and since resistor 91 is connected between cathode 92 and grid 94 the voltage variation is applied to tube 93 as a signal voltage. The polarity of this voltage is such as to counteract the change in current which occurred initially. Therefore the current tends to stay essentially constant, although slight variations must occur to initiate action in the circuit.

By way of illustration, consider the action of the circuit if a negative-going voltage is impressed on grid 82 of vacuum tube 83. The flow of current through tube 83 and hence through resistor 91 and tube 93 is diminished, with a resulting diminution of the voltage drop across resistor 91. Therefore the grid cathode voltage on tube 93 is lessened, reducing the resistance of tube 93, and hence of the entire series circuit from anode 98 to cathode 84, to current flow. Therefore an increase in current occurs wholly or partially canceling the previous reduction and maintaining an essentially constant current.

The circuit may be considered as a voltage divider with tubes 83 and 93 acting as variable resistances, each tube having a plate resistance substantially proportional to its control grid voltage, being pentodes in the example. Since an increment of change of grid voltage on tube 83 causes an increment of change of grid voltage of opposite polarity on tube 93, the plate resistances of the tubes change in opposite directions.

Because the total current through this arm of the circuit remains essentially constant, the linearity of voltage division is improved over that of an amplifier of the type used in Fig. 1.

The variations in potential at anode 90 are impressed directly on the control grid 101 of the power tube 102, which as in Fig. 1, is a cathode follower stage which provides isolation for the differentiator system so that its accuracy will not be affected by loading caused by following circuits or stages.

It will be apparent to those skilled in the art that the modifications and improvements as shown in Fig. 2 are not the only ones possible. Therefore I claim all such departures from the basic circuit as herein disclosed as may fall fairly within the scope and intent of the hereinafter appended claims.

What I claim is:

1. An electronic circuit for obtaining from a given input voltage an output voltage substantially proportional to a mathematical derivative with respect to time of said input voltage, comprising an isolating circuit, means for applying said input voltage to said isolating circuit, a differentiating capacitor and a differentiating resistor serially connected, means for impressing the output of said isolating circuit onto said resistor and capacitor, a cathode follower circuit, means for applying the output of said cathode follower in series with said differentiating resistor, an amplifying and inverting circuit, means for impressing said output of said cathode follower and voltages appearing across said differentiating resistor onto said amplifying and inverting circuit, and means for impressing the output of said amplifier and inverter onto the input of said cathode follower.

2. An electronic circuit for obtaining from a given input voltage an output voltage substantially proportional to a mathematical derivative with respect to time of said input voltage, comprising a capacitor and resistor serially connected, the numerical product of the capacitance in farads of said capacitor and the resistance in ohms of said resistor being less than the period in seconds of an applied periodic input voltage wave, means for inverting at least a portion of any voltage developed across said resistor, means for feeding back said inverted voltage in series with said resistor, and means for impressing said input voltage across said capacitor, said resistor, and said feedback means.

3. Apparatus for producing negative feedback, comprising in combination a first thermionic tube having a plurality of electrodes including an anode, a cathode, and at least one grid, a source of positive potential, a load resistor connected in the anode-cathode circuit of said thermionic tube, and means for biasing said grid negatively with respect to said cathode; a second thermionic tube having a plurality of electrodes, including an anode, a cathode, and at least one grid, a source of positive potential for energizing the anode of said second tube, means for impressing said positive potential onto said second tube anode, a first resistor connected from said second tube cathode to a source of reference potential, and a second resistor connected from a point between said first resistor and said second tube cathode to the grid of said first thermionic vacuum tube.

WILLIAM A. HIGINBOTHAM.

REFERENCES CITED

The following references are of record in the file of this patent:

UNITED STATES PATENTS

| Number | Name | Date |
|---|---|---|
| 2,251,973 | Beale et al. | Aug. 12, 1941 |
| 2,282,381 | Root | May 12, 1942 |
| 2,324,797 | Norton | July 20, 1943 |